Dec. 15, 1936.  G. M. LOCK ET AL  2,064,480
BEAN CUTTER
Filed Sept. 9, 1935  3 Sheets-Sheet 3

INVENTORS
G. M. Lock
A. O. Rasmussen
BY
ATTORNEY

Patented Dec. 15, 1936

2,064,480

UNITED STATES PATENT OFFICE 2,064,480

BEAN CUTTER

George M. Lock and Arthur O. Rasmussen, Modesto, Calif.

Application September 9, 1935, Serial No. 39,745

4 Claims. (Cl. 55—107)

This invention relates to bean cutting machines, and particularly to one arranged as an attachment adapted to be mounted on and project ahead of a tractor to cut a number of rows of bean vines simultaneously.

The principal object of our invention is to provide a machine of this type having a highly efficient form of vine cutting elements which we believe to be novel for this use, whose efficient operation is not affected by relative movement between the tractor and the frame supporting the cutting elements, as in traversing undulating ground.

These cutting elements are in the form of discs, and a further object of our invention is to mount these discs so that their angular setting may be adjusted to give the most efficient results, and so that all the discs may be raised or lowered as a unit relative to the ground, so that they may be all set to the same cutting depth, or raised entirely clear of the ground as may be desired.

A further object of the invention is to produce a simple and inexpensive device and yet one which will be exceedingly effective for the purpose for which it is designed.

These objects we accomplished by means of such structure and relative arrangement of parts as will fully appear by a perusal of the following specification and claims.

In the drawings similar characters of reference indicate corresponding parts in the several views.

Figure 1:
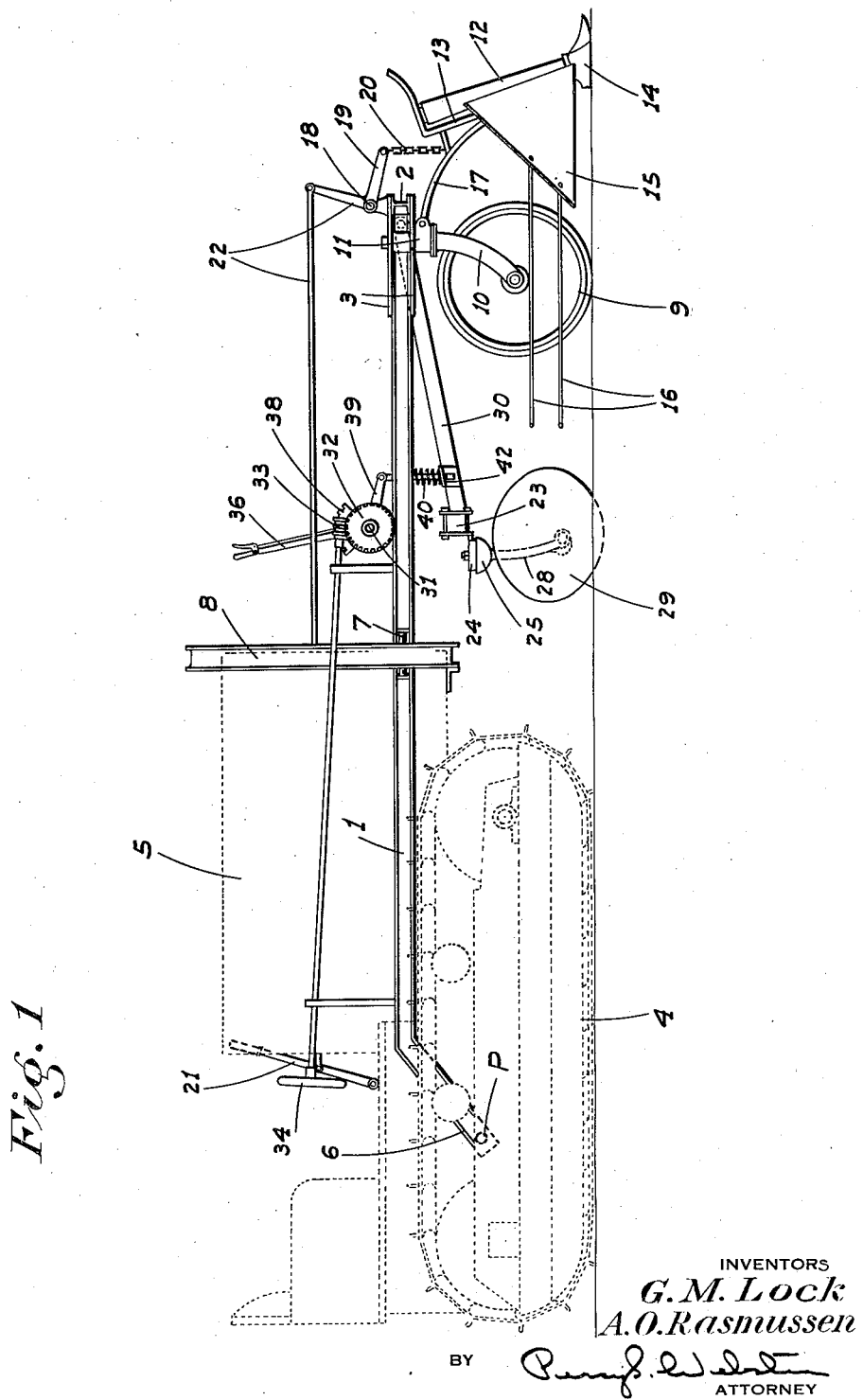
Figure 1 is a side elevation of our improved bean cutter, as mounted on a tractor.
Figure 2:
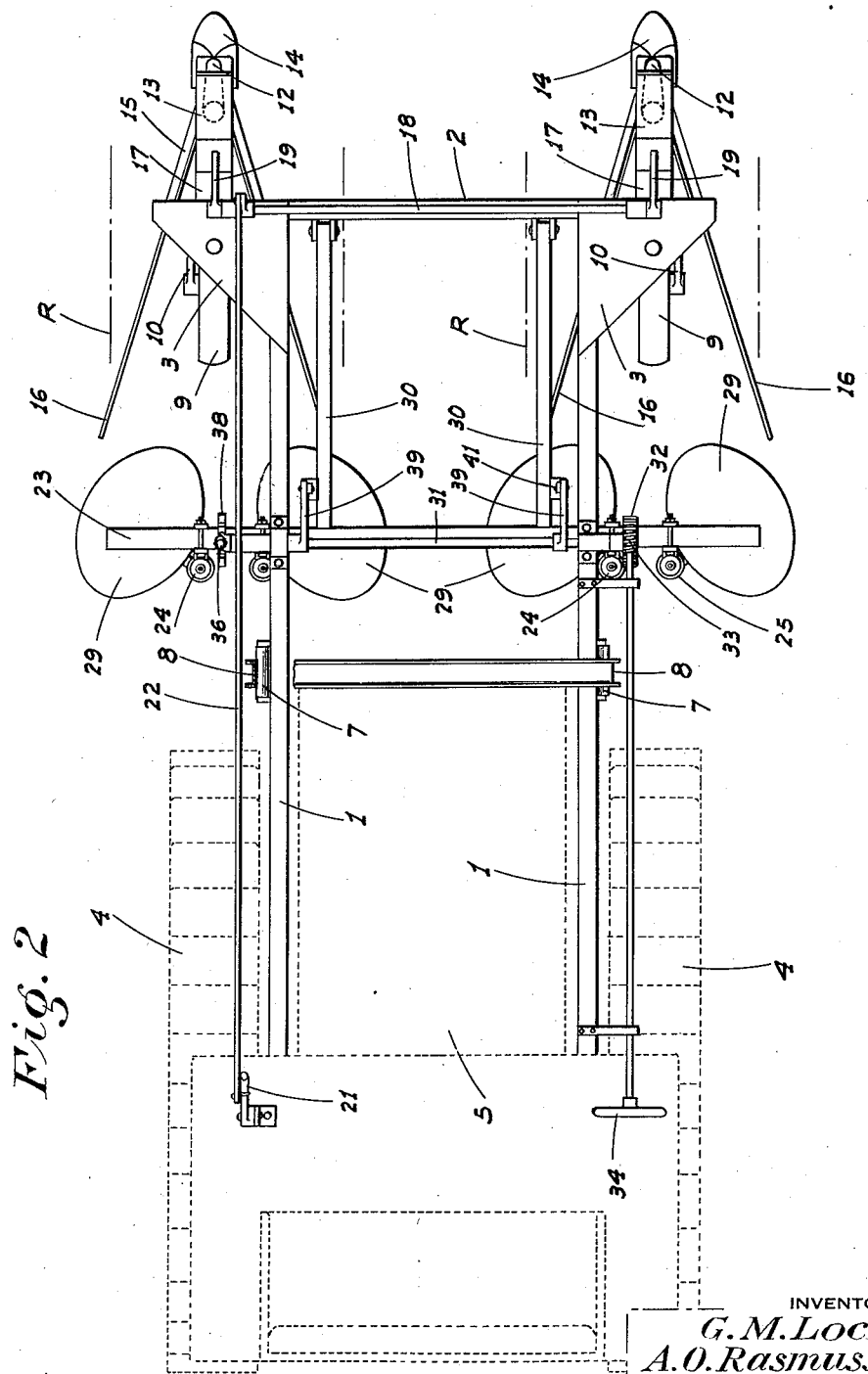
Figure 2 is a top plan view of the same.
Figure 3:
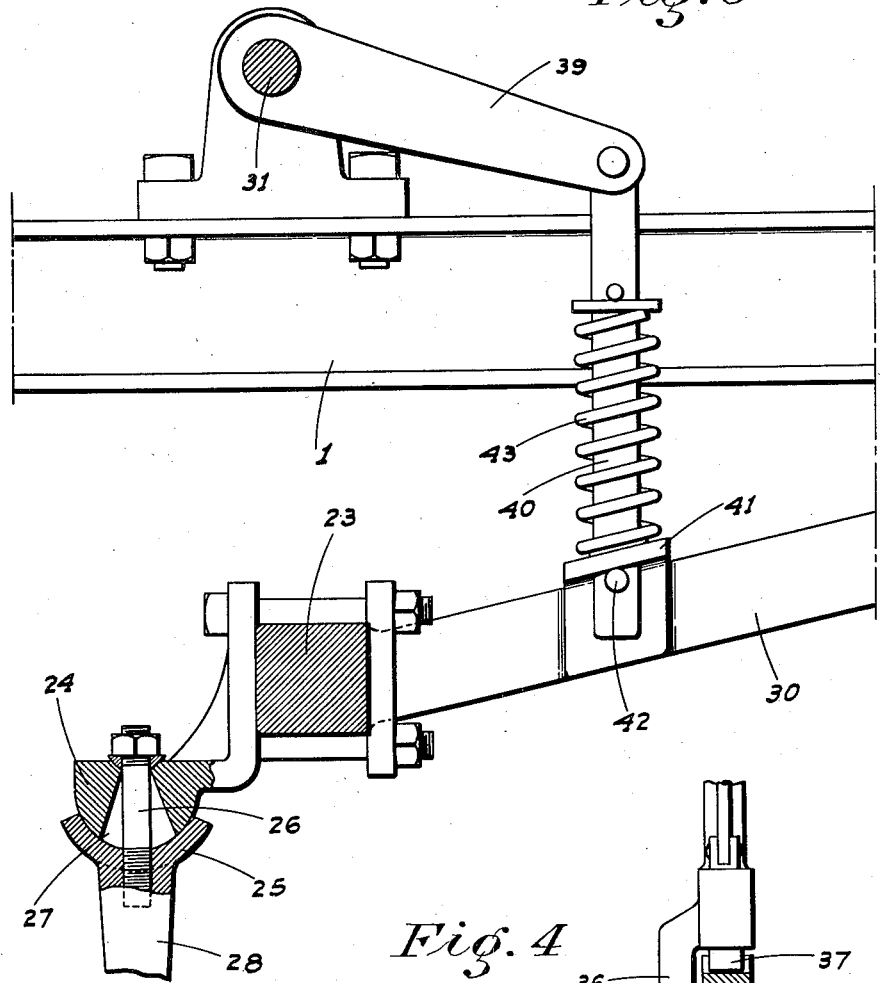
Figure 3 is an enlarged fragmentary side view, partly in section, of the disc mounting and control mechanism.

Referring now more particularly to the characters of reference on the drawings, the bean cutting attachment comprises a supporting frame consisting of side beams 1 connected at their forward end by relatively wide cross beam 2, gusset plates 3 are secured to and extend between the end portions of the cross beam 2 and the adjacent portions of the side beams, serving not only to stiffen the frame, but as supports for the swivel wheels of the frame as will be seen later.

The beams 1 are spaced apart to fit between the wheels or endless tracks 4 and the body 5 of a tractor. In the type of tractor shown, the beams 1 are preferably bent sharply down toward their rear ends as at 6, with their rear lower ends pivoted as at P in any suitable manner on the frame of the tractor just ahead of the track engaging gears thereof, as indicated.

The beams 1 project ahead of the tractor a distance approximately equal to the length of the tractor, and at the front of the tractor are provided with outwardly facing rollers 7 set lengthwise of the beams and riding against the inner faces of upright beams 8 rigidly mounted on the tractor in any suitable manner. The pivoted frame above described is supported at its front end by caster wheels 9, disposed in line with the tractor tracks or wheels 4. These wheels 9 are individually mounted between forks 10, whose spindles are turnable in bearing boxes 11 mounted on the gusset plates 3.

Disposed ahead of the wheels 9 are vine deflecting rollers 12 mounted in suitable brackets 13; ground engaging shoes 14 rigid with the brackets projecting forwardly from the lower ends of the rollers. Shield plates 15 project rearwardly from the brackets and rollers in diverging relation to each other, so as to keep the vines from becoming entangled in the wheels while allowing the latter free swivel movement. Deflecting rods 16 project rearwardly past the wheels from the plates 15.

The brackets 13 are provided with arms 17 pivoted on the adjacent boxes 11, so that the shoe and roller units may follow ground undulations. Said units may be raised clear of the ground at the option of the driver of the tractor, as when passing over small check levees or the like, by a cross shaft 18 on the beam 2 and having forwardly projecting arms 19 from which normally slack chains 20 or the like depend to connections with the brackets 13. The shaft 18 is rotated to raise the roller units by a lever 21 mounted on the tractor to one side thereof but convenient to the driver, and connected to said shaft by suitable means 22.

Extending transversely below the beams 1 between the wheels 9 and the front of the tractor is a rigid bar 23. Strapped on said bar for adjustment lengthwise thereof and preferably disposed just to the rear of the same are ball members 24, cooperating with sockets 25 therebelow. Clamping bolts 26 mounted in the sockets thereof and projecting upwardly through downwardly diverging openings 27 in the balls, enable said sockets to be swung to and clamped in different positions on the balls.

Standards 28 rigid with and depending from the sockets, support concave cutting discs 29 of conventional form; antifriction bearings being used about the disc spindles so as to assure ease of rotation of the discs. By reason of the adjustability of the balls 24 along the bar 23, the spacing of the discs may be adjusted to suit the spacing of the rows of vines; while the adjustable mounting of the standard sockets on the balls enables the angularity of the discs, whether in a transverse or a longitudinal plane to be independently adjusted to give the most efficient action under all conditions.

In the attachment shown, we have provided four discs to cut four rows R of vines simultaneously; the center discs being set to turn the cut vines inwardly or toward each other, while the outer discs are set to turn the vines of the corresponding rows outwardly. Then on the subsequent trip down the field, the outer rows of vines then being cut are those next to the outer rows previously cut, and being also turned outwardly merge and form a windrow with said previously cut rows, as will be evident.

It is here noted, that while we have shown the device as adapted to cut four rows of vines, it may be made to cut any number of rows desired, merely by increasing the length of the bar 23, and adding the requisite number of discs and their supporting units. Also, no change of any kind to any other part of the attachment is called for by such addition.

The bar 23 is supported from the frame for raising and lowering movement by tension arms 30 projecting forwardly from said bar and pivoted on the cross beam 2. Journaled on the beams 1 above the bar 23 is a cross shaft 31. At one end, this shaft is provided with a worm gear 32 engaged by a worm 33 operable from a hand wheel 34 disposed adjacent the driver's seat on the tractor.

Figure 4:
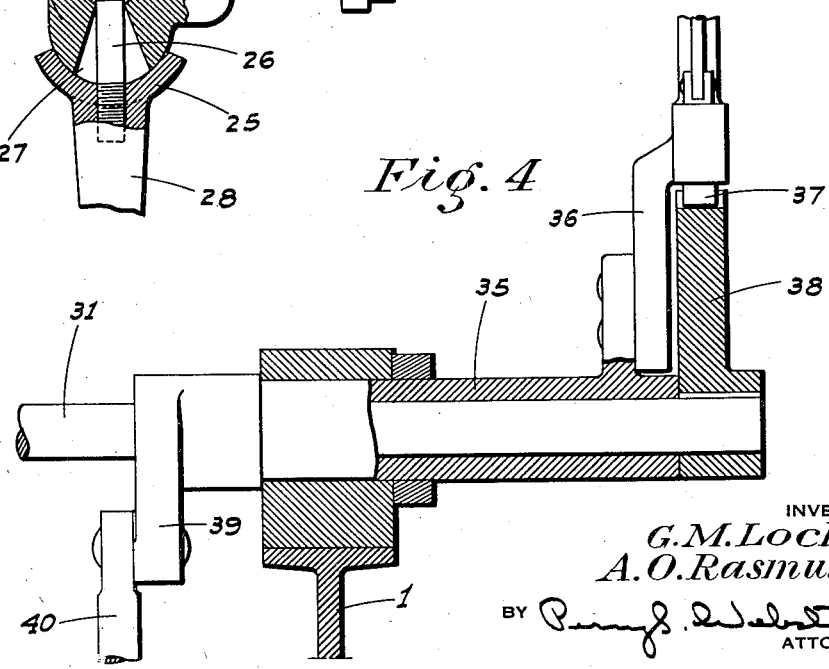
Figure 4 is an enlarged fragmentary transverse section of the disc control shaft unit.

A sleeve 35 (see Figure 4) is turnable on the opposite end portion of the shaft 31. This sleeve is provided with a lever 36 rigid therewith, which lever has a releasable pawl 37 selectively engaging the notches of a quadrant 38 rigid with the shaft 31 at its adjacent end.

Arms 39 project forwardly from the shaft 31 and from the sleeve 35 in substantially overhanging relation to the arms 30. Rods 40 pivoted on the arms 39 slidably depend through brackets 41 fixed on and projecting laterally from the arms 30. Upward movement of the rods relative to arms 30 is limited by cross pins 42 on the rods below the brackets; while upward movement of arms 30 relative to the rods is yieldably restrained by compression springs 43 about the rods.

It will thus be seen that as the shaft 31 is turned by the worm gearing to swing the arms 39 up, the cross pins 42 engage the brackets, and raise the arms 30. This of course raises the bar 23 and the discs attached thereto as well. At the same time, regardless of the position of the arms 39, the arms 30 may yield upwardly without moving said arms 39 or the rods, so that the discs, if engaging an obstruction, may yield without harm.

It will here be noted that the discs being circular, their effectiveness is not altered by any raising or lowering of the supporting bar, or by any shifting of the frame out of level as may occur when the tractor and attachment pass over uneven ground, and which would cause the ordinary flat cutters to dig in unduly at one end or the other.

By the use of the rotary adjustable sleeve 35 on the shaft 31, and to which one of the bar supporting arm and rod units is attached, the bar 23 may be set at an angle to a horizontal transverse plane, thus setting the discs on a transverse slope. In this manner, any transverse unevenness of the tractor and attachment, and which may be caused by certain ground or operating conditions, may be counteracted at the bar 23, and the latter maintained in a position such that all the discs will still cut to the same depth.

While we have particularly shown and described the discs and their universally adjustable supports as being the cutting units, blades or other form of ground working tools may be adjustably mounted on the bar 23 instead, in certain cases.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In a bean cutter, a frame, cutting elements supported from the frame, wheels supporting the frame at its forward end, deflecting rollers in front of the wheels, mounting means for said rollers, and shield plates mounted on the mounting means and projecting rearwardly therefrom in diverging relationship.

2. In a bean cutter, a frame, cutting elements supported from the frame, wheels supporting the frame at its forward end, deflecting rollers in front of the wheels, mounting means for said rollers including rearwardly projecting arms pivoted at their upper ends in connection with the frame, and ground bearing shoes on the mounting means at the lower end of the rollers.

3. In a bean cutter, a carrying frame, cutting elements supported from the frame, roller mounting means carried by the frame ahead of the cutting elements, deflecting rollers supported in said means, and shield plates mounted on said mounting means and projecting rearwardly from the rollers in diverging relationship.

4. In a bean cutter, a carrying frame, cutting elements supported from the frame, a roller mounting means including rearwardly projecting arms pivoted at their upper ends in connection with the frame, ground bearing shoes supporting the mounting means at the lower end thereof, and rollers mounted in the mounting means.

GEORGE M. LOCK.
ARTHUR O. RASMUSSEN.